(12) United States Patent
Scrafford et al.

(10) Patent No.: US 7,949,740 B2
(45) Date of Patent: May 24, 2011

(54) METHODS AND SYSTEMS FOR PRIORITIZED SERVICING OR MAINTENANCE OF NETWORKED PRINTERS

(75) Inventors: Matthew Scrafford, Fairport, NY (US); Shawn Kammerdiener, Rochester, NY (US); Kirk Pothos, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 897 days.

(21) Appl. No.: 11/696,438

(22) Filed: Apr. 4, 2007

(65) Prior Publication Data

US 2008/0247767 A1 Oct. 9, 2008

(51) Int. Cl.
*G06F 15/173* (2006.01)
(52) U.S. Cl. .............................. 709/223; 358/1.15; 710/8
(58) Field of Classification Search .................. 709/223, 709/224; 710/8; 358/1.15
See application file for complete search history.

(56) References Cited

U.S. PATENT DOCUMENTS

| | | | |
|---|---|---|---|
| 5,488,715 A | 1/1996 | Wainwright | |
| 6,498,656 B1 | 12/2002 | Mastie et al. | |
| 6,732,195 B1 * | 5/2004 | Baldwin | 710/6 |
| 6,901,446 B2 | 5/2005 | Chellis et al. | |
| 7,086,001 B1 * | 8/2006 | Hicks et al. | 715/209 |
| 2002/0196463 A1 | 12/2002 | Schlonski et al. | |
| 2003/0090697 A1 | 5/2003 | Lester et al. | |
| 2003/0093521 A1 | 5/2003 | Schlonski et al. | |
| 2003/0110413 A1 | 6/2003 | Bernklau-Halvor | |
| 2003/0142344 A1 | 7/2003 | Geske et al. | |
| 2004/0103337 A1 | 5/2004 | Smith | |
| 2006/0044600 A1 * | 3/2006 | Oosawa | 358/1.15 |
| 2006/0132826 A1 | 6/2006 | Ciriza et al. | |
| 2006/0197973 A1 | 9/2006 | Castellani et al. | |
| 2006/0206445 A1 | 9/2006 | Andreoli et al. | |
| 2006/0259549 A1 * | 11/2006 | Huang | 709/203 |
| 2007/0153312 A1 * | 7/2007 | Filbrich | 358/1.13 |

FOREIGN PATENT DOCUMENTS

| | | |
|---|---|---|
| EP | 0 921 465 A2 | 6/1999 |
| JP | 04344967 A * | 12/1992 |
| JP | 2003177945 | 6/2003 |

OTHER PUBLICATIONS

European Search Report, EP 08 15 2983, Jan. 27, 2010.
CUPS Software Administrators Manual, Chapter 4, "Printer Classes", available on the Internet at www.cups.org/PRINTER_CLasses, Cups-Sam-1.1.21, Easy Software Products, 2003.
Microsoft Knowledge Base Article, No. 318749, "How to: Create a Printing Pool in Windows 2000", available on the Internet at www.support.microsoft.com, Sep. 2003.
Product brochure, "HP Output Server, Reliable Document Delivery Across the Enterprise", available on the Internet at http://www.hp.com/united-states/outputmanagement/products/hpom_output_srvr.pdf, Apr. 2004.
Product brochure, "JetCAPS® ClusterQue, Balanced and Controlled Volume Printing", available on the Internet at http:/h40041.www.4.hp.com/contents/solutions/pdfs/ds_clusterque.pdf, Jul. 2004.
European Search Report, EP 08 15 2982, Nov. 25, 2009.
Teresa F. Lunt, R. Jagannathan, Rosanna Lee, Alan Whitehurst, "Knowledge-Based Intrusion Detection".

* cited by examiner

*Primary Examiner* — Oanh Duong
(74) *Attorney, Agent, or Firm* — Fay Sharpe LLP

(57) ABSTRACT

Methods and systems are presented for prioritizing service or maintenance of networked printers based on affinities between printers and users determined from job tracking data so that printers shared by large numbers of users or high volume printers used by only one or a few users can be serviced or maintained before other printers to provide overall printer support while mitigating user disruption due to unavailable printers.

20 Claims, 5 Drawing Sheets

METHODS AND SYSTEMS FOR PRIORITIZED SERVICING OR MAINTENANCE OF NETWORKED PRINTERS

BACKGROUND

The present disclosure is generally related to servicing and maintaining printer output devices such as printers, copiers, facsimile machines and the like in networked printing environments where users submit print jobs to one of a number of printer devices connected to a network. Businesses, universities, government agencies and other large enterprises often network large numbers of personal computers and printers together, allowing users to print to different printer devices based on print job characteristics, printer device capabilities, proximity of a given user to certain printers, and other factors. Distributed computing and printing enterprise architectures provide economic advantages by allowing direction of individual print jobs to the suitable printer with the lowest cost while also maximizing printer device utilization. In addition, networked printer systems can provide redundancy for situations in which one or more printer devices are off-line for servicing or where a given printer is occupied by a very large print job. The costs associated with operating and maintaining large numbers of networked printers, however, can be large, and IT personnel or other staff are often confronted with multiple printer devices requiring servicing and/or maintenance at the same time. In the typical case, service personnel are given a list of printer devices that are in need of servicing or maintenance, based on reports of printer malfunctions provided through device status messages across the network and/or from user calls or emails indicating a printer is malfunctioning. The service list is generally not prioritized, or at best may include some anecdotal suggestions regarding which printer to service first. Many times, this ad hoc prioritization causes the initial service to be provided to the device that was reported earliest, the device for which the most complaints have been received, the device for which a complaint was received from the most senior or important staff member, or other arbitrary factors. As a result, a high volume printer may remain off-line for an extended period of time while a less important printer device is being serviced. Thus, there is a need for improved printer service and/or maintenance prioritization techniques and apparatus by which overall printer device support is provided in a networked printing environment while ensuring adequate timely maintenance and servicing of individual printer devices in an efficient manner and while producing the least user disruption due to unavailable printer output devices.

BRIEF DESCRIPTION

Methods and systems are disclosed for prioritized servicing and/or maintenance of printer devices according to affinities between printers and users in a networked printing environment. Affinity data is determined from job tracking data for print jobs in the network, and is then used to establish a prioritized ordering of devices to be serviced and/or maintained. The disclosure may be advantageously implemented to alleviate disruption of user print jobs by prioritizing printer servicing and maintenance according to printer device affinities or associations between printer devices and user devices derived from the actual job tracking data.

In accordance with one or more aspects of the present disclosure, a printer maintenance/service priority method is provided, including identifying networked printers that require maintenance or servicing and gathering job tracking data for print jobs in a network. Affinity data is determined that indicates associations between printer devices and user devices based on the job tracking data, and a prioritized ordering of the printers is determined at least partially based on the affinity data. The method also includes performing servicing or maintenance to the printer devices according to the prioritized ordering. The prioritized ordering in certain implementations is generated as one or more prioritized listings of printer devices requiring servicing or maintenance, for example, a prioritized service list for repairing out-of-service printer devices, and a prioritized list of printer devices requiring maintenance such as replenishing printer supplies. In certain embodiments, the prioritized ordering may be determined at least partially according to print count values for the plurality of printer devices to facilitate attending to printer devices with high print count values and low affinity values. Output print devices that are not affine to other output devices, which have a large printer volume would require faster service and greater attention to supply replenishment due to the lack of a suitable alternate output device. The method thus employs affinity analysis to identify devices which do not have strong affinities to other output devices and which have a large print volume and accordingly prioritizes these printers for faster or earlier service or maintenance due to the lack of suitable use-based affine relationships. Another possible implementation also prioritizes service or maintenance for printer devices with high affinity values, since these devices are most likely shared by a large number of users. The prioritization, moreover, can selectively prioritize performance of service over maintenance to generally direct attention to out-of-service printers before performing maintenance tasks.

In accordance with further aspects of the disclosure, a networked printing system is provided that is comprised of a plurality of user devices operably coupled with a network and a plurality of printer devices operably coupled with the network. The system further includes a printer device manager component operatively coupled with the network, which operates to identify a plurality of printer devices in the network that require maintenance or servicing, to determine affinity data indicating associations between printer devices and user devices based on job tracking data, and to determine a prioritized ordering of the plurality of printer devices based at least partially on the affinity data. The device manager in various embodiments generates one or more prioritized listings of printer devices requiring servicing or maintenance based at least partially on the affinity data, and may also take into account print count values in determine the ordering(s) for the plurality of printer devices. In one example, the device manager component prioritizes service or maintenance for printer devices with high print count values and low affinity values. In another embodiment, the printer device manager component prioritizes service or maintenance for printer devices with high affinity values and may also prioritize performance of service tasks over maintenance duties.

Other aspects of the disclosure provide a printer device manager system for prioritizing service or maintenance of printer devices connected to a network. The printer device manager system includes an affinity component that gathers job tracking data for print jobs in the network and determines affinity data indicating associations between printer devices and user devices based on the job tracking data. The device manager system further comprises a service and maintenance priority component that operates to determine a prioritized ordering of a plurality of printer devices requiring servicing or maintenance based at least partially on the affinity data. The service and maintenance priority component may generate at least one prioritized list of printers that require service or maintenance based at least partially on the affinity data, and may further determine the prioritized ordering at least partially according to print count values for the printer devices.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
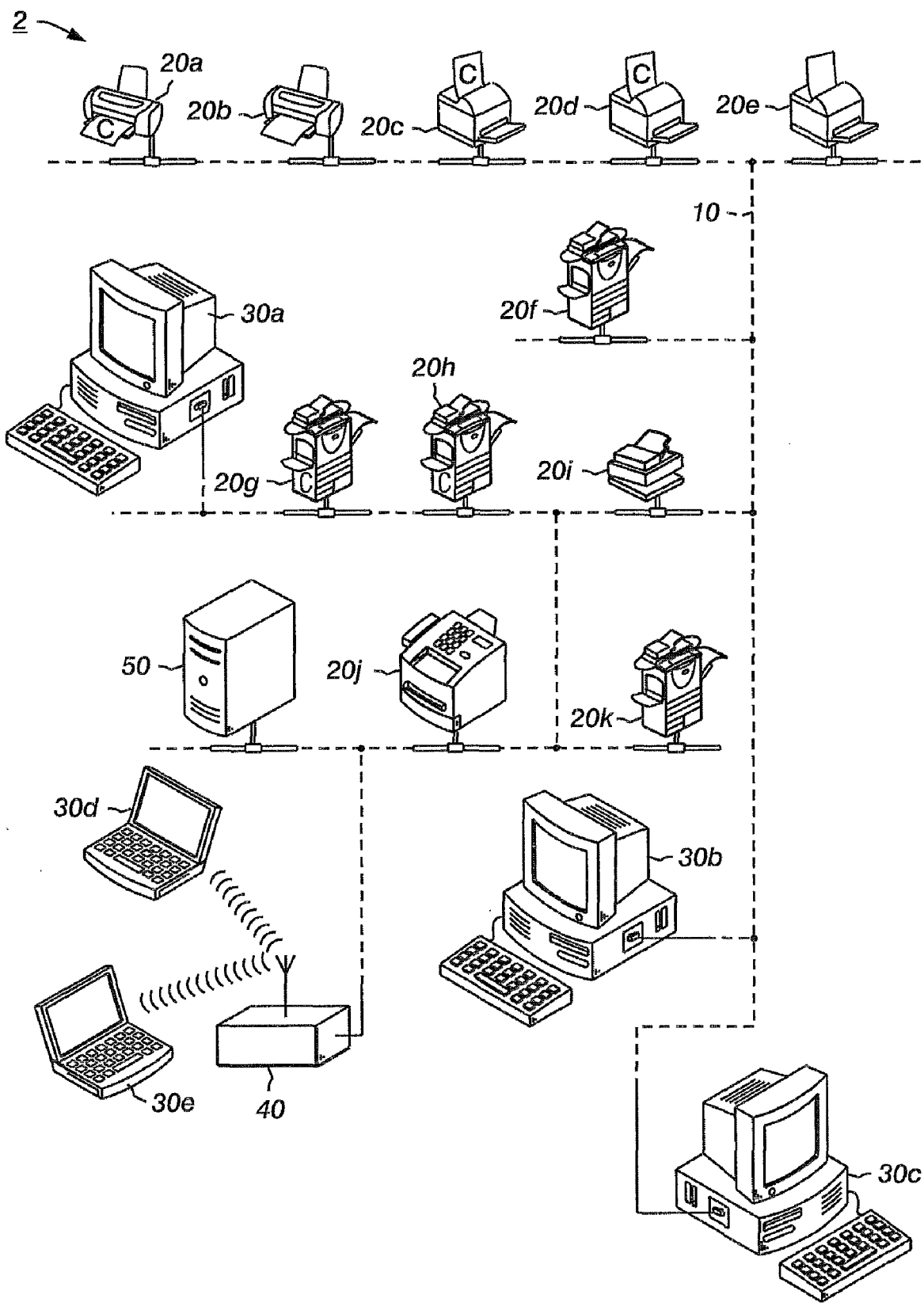
FIG. 1 is a system diagram illustrating an exemplary distributed computing environment with a plurality of user computers and printer output devices operatively coupled to a network along with a network print server in which various aspects of the present disclosure may be implemented.

Referring now to the drawings, FIG. 1 illustrates a distributed computing environment or system 2 in which one or more aspects of the present disclosure may be carried out. The exemplary system 2 includes a network 10 with which a plurality of printer output devices 20 and user computers 30 are operatively coupled. In addition, one or more print servers 50 are coupled with the network 10, where certain portions of the network 10 may be interconnected by cabling or one or more portions may be wireless, and where one or more exemplary computers 30d and 30e are illustrated in FIG. 1 with operative communicative coupling to the network 10 being implemented using a wireless network transceiver interface component 40. Any number of user devices 30 may be operatively coupled to the network 10, including without limitation desktop computers 30a-30b, laptop computers 30d, 30e, and any number and type of printer output devices 20 may be coupled with the network 10.

Various different printer devices 20 are networked together in the system 2 in order to provide the user devices 30 with a broad range of printing options available for a given print job. In the example of FIG. 1, the available printer output devices 20 include relatively low throughput externally fed color as well as black and white desktop printers 20a and 20b, respectively, intermediate speed drawer fed color and black and white printers 20c-20e, high volume color as well as black and white printer/scanner/copier devices 20f-20h and 20k, a desktop combination printer/scanner/copier 20i and a combination printer and facsimile machine 20j. The network 10, moreover, can be arranged in any suitable configuration, for example, such as star, ring, bus, tree, mesh, etc. or combinations thereof, and may be a wired network, a wireless network, or combinations thereof, wherein the illustrated system 2 includes one or more wireless nodes 40 for connectivity for portable laptop computers 30d and 30e through various WiFi or other wireless means. The system 2 thus constitutes an embodiment of a networked printing system with a plurality of user devices 30 operably coupled with the network 10 and a plurality of printer devices 20 with the server 50 also operably coupled with the network 10.

Figure 2:
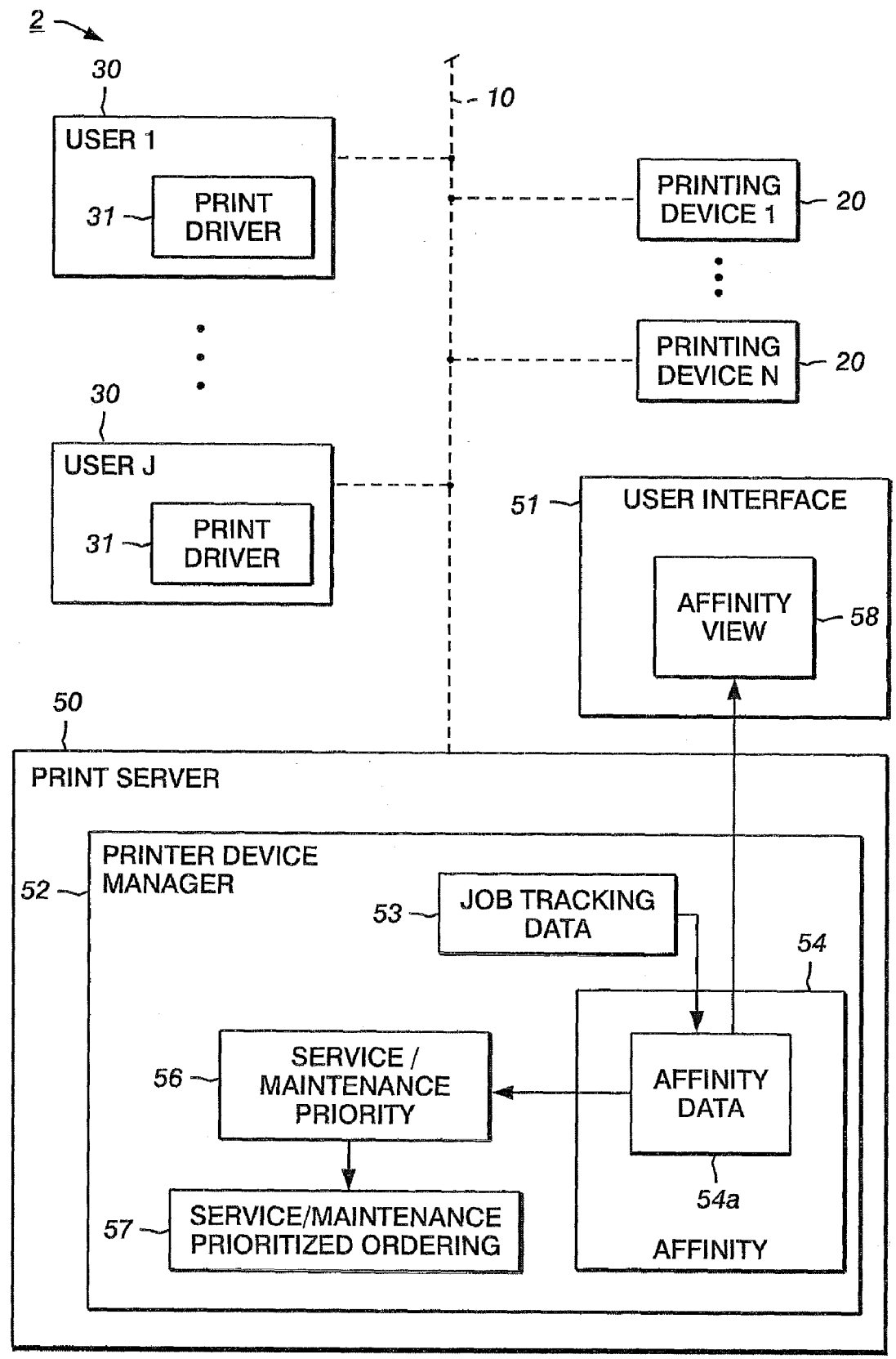
FIG. 2 is a schematic diagram illustrating further details of the print server in the networked system of FIG. 1, including a printer device manager program with an affinity data component that determines printer and user affinity values according to job tracking data, as well as a service and maintenance priority component that determines a prioritized ordering of a plurality of networked printer devices requiring servicing or maintenance according to the affinity data.

Referring also to FIG. 2, the networked system 2 further includes a printer device manager component 52 operatively coupled with the network 10. In one embodiment, the manager component 52 can be a software application running on the network server 50. Other embodiments are possible, for example, wherein the printer device manager 52 is implemented in any suitable hardware, software, logic, firmware, or combinations thereof, whether unitary or implemented in distributed fashion in a number of networked host devices, by which the device manager 52 is operatively communicatively coupled with other devices (e.g., printers 20, user devices 30, etc.) via the network 10. In this regard, the printer device manager 52 may be an application running on any computing host capable of communicating with the printers 20 and users 30 of the system, whether directly coupled to the network 10 or coupled therewith through one or more intervening networks. As further shown in FIG. 2, the user devices 30 may include one or more print drivers 31, such as driver software running on the user devices 30, which may interact with the printer device manager component 52 in supporting various printing services and printer device management actions in the networked system 2.

In accordance with one or more aspects of the present disclosure, the printer device manager 52 receives job tracking data 53 associated with print jobs submitted by user devices 30 to printer output devices 20 in the network 10. In addition, the device manager 52 identifies printer devices 20 in the network 10 that require maintenance or servicing. In one embodiment, the device manager 52 receives messages from the printer devices 20 via the network 10 indicating printer status, for example, "ready", "busy", "off-line", "out-of-service", "out-of-paper", "toner low", etc., where such messages may be prompted by polling messages from the device manager 52 or may be initiated by the printer devices 20 themselves or combinations thereof. Moreover, the printer device manager component 52 may implement a calendar-based maintenance scheduling function in which the device manager tracks the maintenance needs of one or more of the printers 20 and determines whether maintenance is required or recommended for the various printers 20 on the network 10 based on the maintenance function and the current time and date. Furthermore, the printer device manager 52 is adapted to receive input data via a user interface 51 coupled to the print server 50, by which service or maintenance calls or emails from users 30 can be logged with related information about specific printer problems, status conditions, toner or paper supply requirements, etc. The device manager 52 may also communicate with other computers, servers, etc., whether directly or indirectly coupled with the network 10, by which other information may be obtained that indicates or tends to indicate that one or more printer devices 20 on the network 10 require servicing and/or maintenance. For instance, user devices 30 may provide printer status information to the device manager 52 via emails or other forms of messaging via the network 10 from which the device manager 52 determines whether a given printer device 20 is in need of service or maintenance.

The printer device manager 52, moreover, includes an affinity component 54 which gathers the job tracking data 53 and determines affinity data 54a indicating associations between printer devices 20 and user devices 30 based on the job tracking data 53. The exemplary device manager 52 also includes a service and maintenance priority component 56 that uses the affinity data 54a to determine a prioritized ordering 57 of the printers 20 requiring maintenance or service. In the embodiment of FIGS. 1 and 2, moreover, the print server 50 and the device manager component 52 thereof are operatively coupled with a user interface 51 for receiving operator inputs and for displaying or rendering information to an operator. In this regard, the affinity component 54 of the device manager 52 provides an affinity view or rendering 58 to the user interface 51, as illustrated and described further below with respect to FIG. 3.

In accordance with the present disclosure, affinity data 54a is determined by the affinity component 54 to indicate associations between the printer devices 20 and user devices 30 based on the job tracking data 53. The affinity data 54a is then utilized by the service and maintenance component 56 in determining a prioritized service and/or maintenance ordering 57 for use in servicing and maintaining the printer devices 20 in a prioritized fashion in the networked system 2. In this regard, the affinity data 54a may be any form of numeric and/or graphical representation, such as affinity values that are derived from the job tracking data 53. In this respect, the job tracking data 53 indicates or includes various parameters associated with a submitted print job, including the identity of the submitting user device 30, the time and date of job submission, a target printer device 20 to which the job was initially submitted, and the identity of any secondary or alternate printer device 20 to which the job may have been redirected. In addition, the job tracking data 53 may include information regarding the specific printing requirements of the job, including without limitation document type, requested media size, document color, page count, duplexing conditions, and finishing options such as stapling, binding, collating, etc. From the job tracking data 53 concerning user print requests to print output devices 20, the affinity component 54 of the printer device manager 52 determines the affinity data 54a using any suitable mathematical analysis, data sorting, or other algorithms or computational techniques to correlate patterns of user printing behavior to derive affinities that exist between devices 20 themselves and between users 30 and printer devices 20, as well as affinities between the user devices 30 themselves.

The affinity data or value 54a associated with or between printer output devices 20 is a measure of their common use by a user or set of users. For instance, if a first user device 30 sends print jobs to only two printers 20, there is an affinity between those two printer devices 20. If a second user 30 also prints to those two printers 20, the affinity between these printers 20 is increased. Similarly, the common usage of one or more printers 20 by two given users 30 indicates an affinity between the users 30 based on their corresponding print job tracking data 53. In this regard, the present disclosure contemplates that because the job tracking data 53 is dynamic and is updated by further print job submissions, the job submission, job redirection, and the derived affinity data 54a will tend to adapt to changes in the print environment in the system 2. Accordingly, one or more relationships, events, and/or conditions may be inferred or detected based on the affinity data 54a, such as the relative priorities of the printer devices 20 with respect to servicing and/or maintenance in the system 2.

Figure 3:
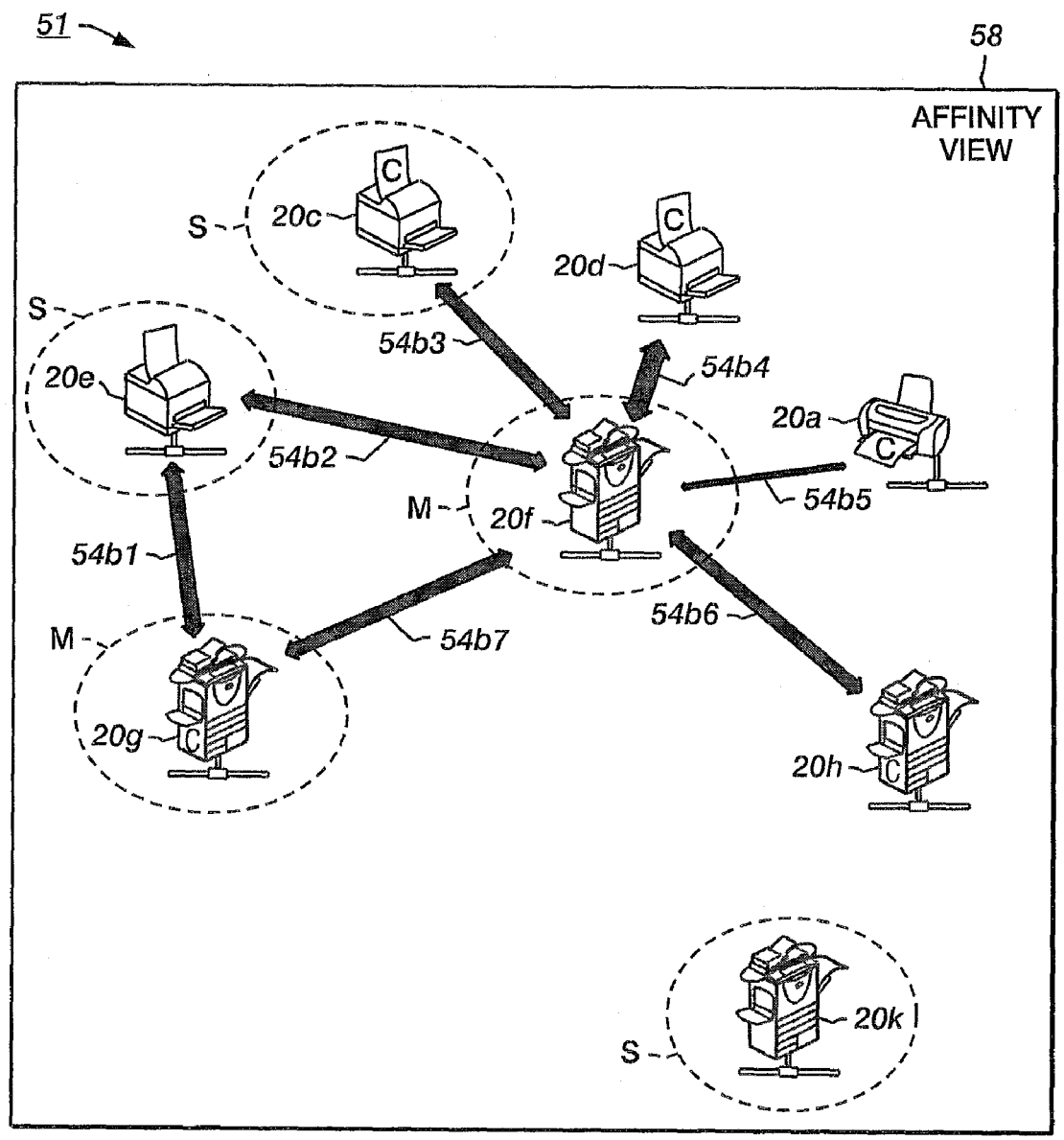
FIG. 3 is a schematic diagram illustrating an exemplary affinity view user interface rendering in the device manager of FIGS. 1 and 2 showing affinity relationships between various printer devices based on job tracking data in the network.

An exemplary affinity view 58 is illustrated in FIG. 3, which may be rendered or otherwise presented to an operator via the user interface 51 associated with the server 50 in the system 2. In this simplified depiction of FIG. 3, only a few exemplary printer devices 20 are shown so as not to obscure the various aspects of the present disclosure, wherein it will be appreciated that affinity views 58 of large networked systems 2 may include graphical indicia or icons representing any number of networked printers 20 and the affinities therebetween. In the example of FIG. 3, affinities between printers 20 are represented as arrows 54b, wherein the thickness of the arrow 54b indicates the value of the affinity with thicker arrows 54b indicating stronger affinities and vice versa. In this embodiment, moreover, the affinity view 58 may automatically group icons of strongly affine printers 20 together with devices 20 having weak affinities spaced from the strongly affine groups or clusters, in order to allow an operator to easily see the affinity relationships of the various printer devices 20 in a given system 2 or a portion thereof. Alternatively or in combination, the affinity view 58 may allow an operator to drag the printer device icons 20 as desired to more easily ascertain affinities of a given printer 20 or printer group.

In the example of FIG. 3, several of the printer devices 20a, 20c, 20d, 20e, 20f, 20g, 20h, and 2k are shown from the system 2 of FIGS. 1 and 2, wherein certain devices 20 and users 30 are omitted from the depiction of FIG. 3 for clarity. In certain embodiments, moreover, the affinity view 58 may provide indicia of the service or maintenance status or requirements of the indicated printer devices 20, thereby facilitating the identification by an operator of which printers 20 require servicing and/or maintenance. In one possible implementation, an operator can roll a mouse or other pointing device over a given printer icon 20 and be provided with text, audible information, or other indication of the status of the device 20, such as text indicating "out-of-paper", "offline", etc. In another possible embodiment, the affinity view 58 may provide different colors to the printer device icons in order to indicate status information. In this example, an icon may be colored red for devices 20 in need of service, with other colors being used to indicate printer devices 20 in need of maintenance or those having no known maintenance or servicing requirements.

As shown in FIG. 3, a strong affinity 54b1 exists between printers 20e and 20g, thereby indicating that users of printer 20e are very likely to also utilize printer 20g and vice versa. Somewhat weaker affinities exist in this example between printers 20e and 20f (affinity 54b2), printers 20c and 20f (affinity 54b3), printers 20g and 20f (affinity 54b7), and between printers 20f and 20h (affinity 54b6). In addition, a strong affinity 54b4 exists between printers 20d and 20f, while a fairly weak affinity 54b5 is shown in the affinity view 58 between printers 20a and 20f. Moreover, printer 20k has little or no affinity to any other illustrated printers 20.

In accordance with the present disclosure, moreover, the print manager component 52 operates to automate the prioritized provision of service and/or maintenance to the printer devices 20 in the networked system 2. The service/maintenance prioritization is done, at least in part, based on the affinity data 54a, and may also take other factors into account in generating the prioritized ordering 57 including without limitation print count values associated with printer devices 20 requiring service or maintenance. In this respect, the service and maintenance priority component 56 of the exemplary device manager 52 prioritizes service or maintenance for printer devices 20 having high print count values and low affinity values, and also prioritizes service or maintenance for printers 20 with high affinity values, and further prioritizes service provision over maintenance tasks.

These aspects of the illustrated embodiment are exemplified by the affinity data 54a shown in the affinity view 58 of FIG. 3 that represents the propensity for users 30 utilizing a specific printer 20 to also utilize a related printer 20, and also identifies printer devices 20 that are not widely used in the networked system 2. In the scenario of FIG. 3, the networked printers 20c, 20e, and 20k each require service, as indicated by the dashed circles labeled "S", while printers 20f and 20g require maintenance as shown by the dashed circles "M". Many other possible service and/or maintenance situations can be addressed by the various aspects of the present disclosure, wherein the scenario of FIG. 3 is but one example. With respect to the illustrated affinities, moreover, printer 20f has affinities to a large number of other printers (printers 20a, 20c, 20d, 20e, 20g, and 20h), whereas printer 20k has substantially no affinity to other printer devices 20, but has a high print count value indicating use for a large number of print jobs and/or for high page count jobs.

In accordance with the present disclosure, this affinity information or data 54a, as graphically depicted by the affinity arrows 54b in FIG. 3, can be advantageously employed by the print manager component 52 in automated determination of service or maintenance priorities. In one respect, the priority component 56 of the device manager 52 recognizes from the affinity data 54a that the out-of-service printer device 20k is not affine to other output devices 20. In this example, moreover, the printer device manager component 52 also recognizes that the printer 20k has a large print count value, and thus identifies the printer 20k as a large volume printer for which there is likely no suitable alternate output device 20 in the network 10. In this situation, the priority component 56 gives a high priority to servicing the printer 20k, since the affinity data 54a indicates that there is no suitable alternate output device 20 to which print jobs may be redirected, and since the high print count indicates that the printer 20k is used fairly often and/or for large print jobs.

Also of note in FIG. 3 is the central multi-purpose printer 20f, indicated as being due for maintenance in this example, where the printer 20f has affinity to many other printers 20. The priority component 56 of the device manager 52 in this instance determines from the affinity data 54a that the device 20f is used as a primary or secondary printer by a large number of users 30, and therefore the printer 20f is assigned a high maintenance priority.

Figure 4:
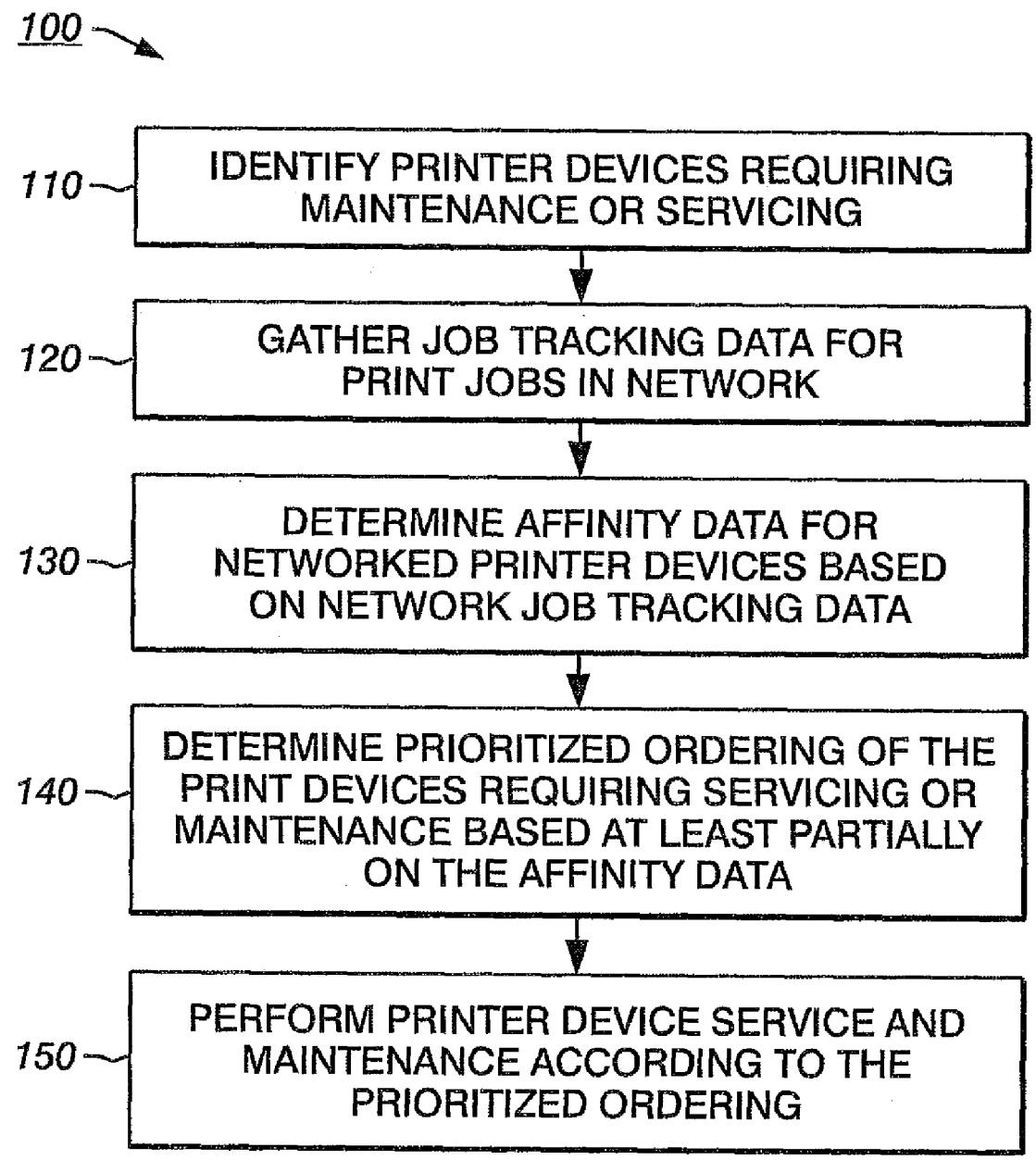
FIG. 4 is a flow diagram illustrating an exemplary method for affinity-based printer maintenance or service prioritization in a networked printer environment in accordance with the present disclosure.

Referring also to FIG. 4, a flow diagram is provided illustrating an exemplary method 100 for performing printer device maintenance and service prioritization in a networked printer environment in accordance with the present disclosure, which is implemented in the exemplary printer device manager component 52 in the embodiments of FIGS. 1 and 2. Although the method 100 and other methods of the disclosure are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 100 and other methods of the disclosure may be implemented in hardware, software, or combinations thereof, whether in a single device management component or system or in distributed form in two or more components or systems, and may be employed in association with any form of printing devices including without limitation desktop printers, network printers, copiers, scanners, facsimile machines, multi-function printer/copier/facsimile devices, high-speed printing/publishing systems and digital printing presses, etc., wherein the disclosure is not limited to the specific devices, systems, applications, and implementations illustrated and described herein.

Beginning at 110 in FIG. 4, printer devices 20 are identified that require servicing and/or maintenance. Any suitable means and methodologies may be employed for identifying the service and maintenance needs of the printer devices 20 in the networked system 2 at 110. In one possible implementation, the printer device manager 52 or the priority component 56 thereof receives network messages (whether prompted or device-initiated) and/or user interface input data indicating printer status, implements a calendar-based maintenance scheduling function, and/or receives information from other computers or servers indicating that one or more printer devices 20 require service and/or maintenance, etc. Job tracking data 53 is gathered at 120 in FIG. 4 for print jobs in the network 2, such as by the device manager application 52 or the affinity component 54 thereof in the server 50, with the device manager 52 providing the tracking data 53 to the affinity component 54 in the example of FIGS. 1 and 2.

At 130 in FIG. 4, affinity data 54a is determined for the printers 20 and users 30 based on the job tracking data 53. As described above, any suitable computational techniques or algorithms can be employed in deriving the affinity data 54a from the job tracking data 53 in accordance with the present disclosure. A prioritized ordering 57 is determined at 140 in FIG. 4 based at least in part on the affinity data 54a, such as one or more prioritized lists of the printer devices 20 identified at 110 as requiring servicing or maintenance. Device service and/or maintenance are performed at 150 in prioritized fashion according to the ordering 57. In this regard, many forms of servicing and/or maintenance operations may be undertaken at 150 in accordance with the present disclosure, such as services including repairing out-of-service printer devices 20, maintenance including replenishing supplies to printer devices 20, etc.

Figure 5:
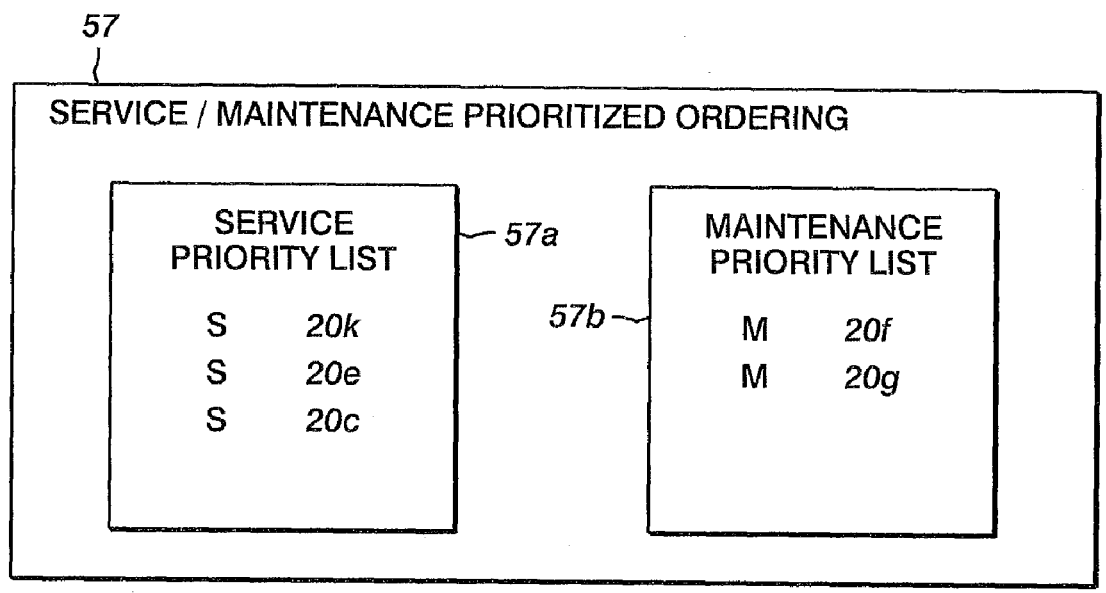
FIG. 5 is a schematic diagram illustrating an exemplary set of service and maintenance priority listings generated by the service and maintenance component of the device manager in FIG. 2 according to the affinity data.
Figure 6:
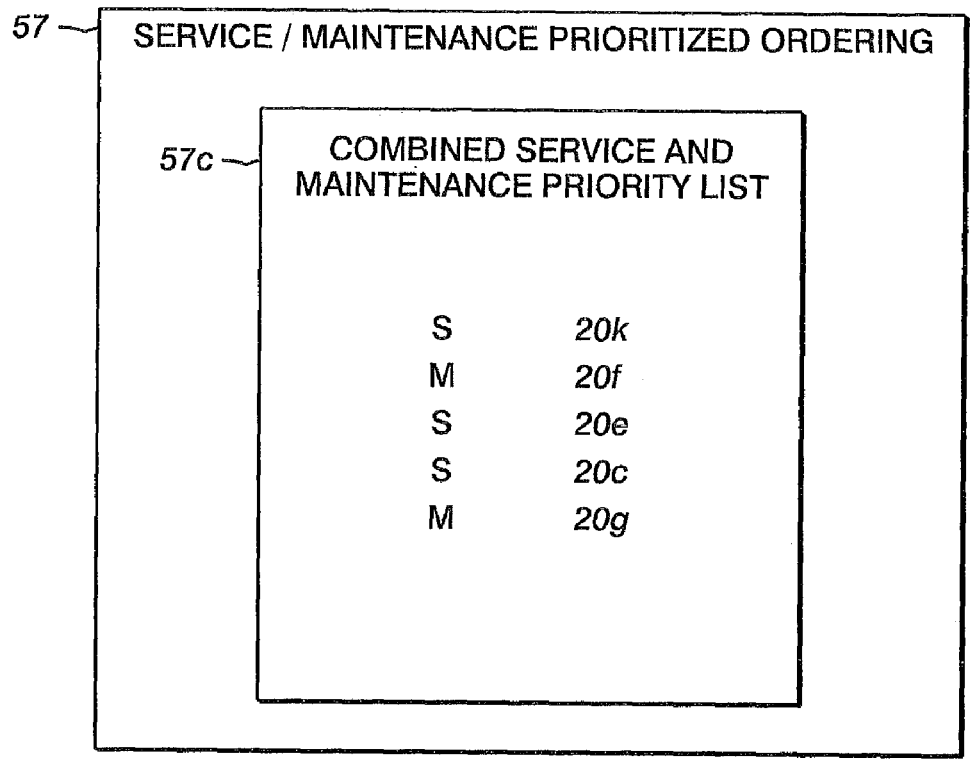
FIG. 6 is a schematic diagram illustrating another exemplary service and maintenance priority listing including a composite listing of devices requiring servicing and maintenance.

To further illustrate the operation of the device manager 52 and the method 100, FIGS. 5 and 6 depict exemplary prioritized service and maintenance orderings 57 constructed by the service and maintenance component 56 of the device manager 52 based at least partially on the affinity data 54a. The prioritized ordering 57 may be provided to service personnel, IT administrators, managers, etc. as a printout, in an email, or as part of a network message sent via the network 10 to one or more user devices 30 or to other systems operatively coupled with the networked system 2, for instance, to an off-site printer maintenance business server. FIG. 5 shows one example in which the prioritized ordering includes separate service and maintenance priority listings 57a and 57b, respectively, generated by the service and maintenance component 56 at least partially based on the affinity data 54a. In this case, the listings 57a and 57b may be provided to different service/maintenance personnel, or may be otherwise utilized separately, where the first list 57a corresponds to prioritization of the printer devices 20c, 20e and 20k indicated in FIG. 3 as requiring service (circled S). Similarly, the maintenance list 57b shows the affinity-based prioritization of the printers 20f and 20g identified in FIG. 3 as requiring maintenance (circled M). In an alternate implementation of the separate prioritization of service and maintenance tasks, the ordering 57 can include a single listing with all devices requiring service listed above those requiring maintenance so as to prioritize servicing above maintenance.

In the example of FIG. 5, the priority component 56 uses the affinity data 54a and the print count information from the job tracking data 53 to identify the printer 20k as likely to be a disconnected printer having a large print count, with no other printers 20 affine to it, as shown in the affinity view 58 of FIG. 3. In this respect, the affinity data 54a indicates that users of the printer 20k use no other printers 20. Moreover, if printer 20k were exhibiting failure conditions, or warnings of potential outage, the affinity-based priority assessment selectively prioritizes service of the printer 20k at the top of the service list 57 (above the other printers 20e and 20c requiring service) due to its high importance to a group of users 30 that either cannot or do not use other printers 20. In this example, moreover, the affinity data 54a (alone or together with the print count information) indicates that printer 20e is to be serviced before printer 20c. In this respect, it is noted in FIG. 3 that the printer 20e has affinity to two other printers 20f and 20g, whereas printer 20c has affinity to only one other printer 20f, whereby the prioritized ordering in the service list 57a of FIG. 5 also provides for prioritizing high affinity printers above lower affinity printers in some circumstances, such as where the printer counts for printers 20e and 20c are below a threshold, while prioritizing low affinity devices (printer 20k) higher for high print counts above the threshold. As further shown in the maintenance list 57b of FIG. 5, the priority component 56 in this implementation prioritizes maintenance of the high affinity printer 20f above that of the lower affinity printer 20g for receiving maintenance attention.

Referring also to FIG. 6, another possible implementation is illustrated in which the prioritized ordering 57 provides a combined or composite listing 57c of the devices 20c, 20e, 20f, 20g, and 20k requiring servicing and maintenance in the view of FIG. 3. In this example, the priority component 56 factors the affinity data 54a into the prioritization along with the general notion of prioritizing service tasks above maintenance operations so as to provide overall printer device support while facilitating timely and efficient attention to the printer devices 20 and while mitigating user disruption due to unavailable printer output devices 20. As shown in FIG. 6, the single priority list 57c provides for initially servicing the stand-alone high volume printer 20k (e.g., high print count, low affinity), followed by maintenance of the very high affinity group printer 20f, as this printer 20f shares affinities with many other printers 20 in the infrastructure of the networked system 2. In this respect, if the printer 20f were out of toner or paper for an extended period of time, the replenishment of supplies to printer 20f may quickly reverse any downtime or other adverse impacts to many user devices 30 in the network 10 before proceeding to service or maintain other printer devices 20. In this example, once the printer 20f has been maintained, the service/maintenance personnel would be directed to finish the remaining service tasks for printers 20e and 20c before providing maintenance to the lowest priority device 20g.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for servicing and maintaining networked printer devices, the method comprising:
  identifying a plurality of printer devices in a network that require maintenance or servicing;
  gathering job tracking data for print jobs in the network, the job tracking data including an identity of a submitting user device and an identity of a target printer device to which each of the print jobs was initially submitted;
  determining affinity data based on the job tracking data, the affinity data indicating associations between the target printer devices and the submitting user devices based on user preferences for the target printer devices selected for the submitted print jobs;
  determining a prioritized ordering of the plurality of printer devices based at least partially on the affinity data; and
  performing servicing or maintenance to the plurality of printer devices in the network according to the prioritized ordering,
  wherein the affinity data is a measure of common selection of the target printer devices for the print jobs by the submitting user devices.

2. The method of claim 1, wherein determining a prioritized ordering comprises generating at least one prioritized listing of printer devices requiring servicing or maintenance based at least partially on the affinity data.

3. The method of claim 2, wherein generating at least one prioritized listing comprises:
  generating a first prioritized list of printer devices requiring servicing based at least partially on the affinity data; and
  generating a second prioritized list of printer devices requiring maintenance based at least partially on the affinity data.

4. The method of claim 1, wherein the prioritized ordering is determined at least partially according to print count values for the plurality of printer devices.

5. The method of claim 4, wherein determining the prioritized ordering comprises prioritizing service or maintenance for printer devices with high print count values.

6. The method of claim 5, wherein determining the prioritized ordering comprises prioritizing service or maintenance for printer devices with low affinity values.

7. The method of claim 1, wherein determining the prioritized ordering comprises prioritizing service or maintenance for printer devices with high affinity values.

8. The method of claim 1, wherein determining the prioritized ordering comprises prioritizing performance of service over maintenance.

9. The method of claim 1, wherein performing servicing comprises repairing out-of-service printer devices.

10. The method of claim 1, wherein performing maintenance comprises replenishing supplies to printer devices.

11. A networked printing system comprising:
a plurality of user devices operably coupled with a network;
a plurality of printer devices operably coupled with the network; and
a printer device manager component operatively coupled with the network, the printer device manager operative to identify a plurality of printer devices in the network that require maintenance or servicing, to determine affinity data based on print job tracking data that includes an identity of a submitting user device and an identity of a target printer device to which each of print jobs was initially submitted, the affinity data indicating associations between the target printer devices and the submitting user devices based on user preferences for the target printer devices selected for the submitted print jobs, to determine a prioritized ordering of the plurality of printer devices based at least partially on the affinity data, and to perform the maintenance or servicing to the plurality of printer devices in the network according to the prioritized ordering,
wherein the affinity data is a measure of common selection of the target printer devices for the print jobs by the submitting user devices.

12. The system of claim 11, wherein the printer device manager component generates at least one prioritized listing of printer devices requiring servicing or maintenance based at least partially on the affinity data.

13. The system of claim 11, wherein the printer device manager component determines the prioritized ordering at least partially according to print count values for the plurality of printer devices.

14. The system of claim 13, wherein the printer device manager component prioritizes service or maintenance for printer devices with high print count values.

15. The system of claim 14, wherein the printer device manager component prioritizes service or maintenance for printer devices with low affinity values.

16. The system of claim 11, wherein the printer device manager component prioritizes service or maintenance for printer devices with high affinity values.

17. The system of claim 11, wherein the printer device manager component prioritizes performance of service over maintenance.

18. A printer device manager system for prioritizing service or maintenance of printer devices connected to a network, the printer device manager system comprising:
a server connected to the network, the server comprising:
an affinity component operative to gather job tracking data for print jobs in the network, the job tracking data including an identity of a submitting user device and an identity of a target printer device to which each of the print jobs was initially submitted, and to determine affinity data indicating associations between the target printer devices and the submitting user devices based on user preferences for the target printer devices selected for the submitted print jobs, and
a service and maintenance priority component operative to determine a prioritized ordering of a plurality of printer devices requiring servicing or maintenance based at least partially on the affinity data, and to perform the servicing or maintenance to the plurality of printer devices in the network according to the prioritized ordering,
wherein the affinity data is a measure of common selection of the target printer devices for the print jobs by the submitting user devices.

19. The printer device manager system of claim 18, wherein the service and maintenance priority component generates at least one prioritized listing of printer devices requiring servicing or maintenance based at least partially on the affinity data.

20. The printer device manager system of claim 18, wherein the service and maintenance priority component determines the prioritized ordering at least partially according to print count values for the plurality of printer devices.

* * * * *